US007249093B1

(12) United States Patent
King

(10) Patent No.: US 7,249,093 B1
(45) Date of Patent: Jul. 24, 2007

(54) METHOD OF AND SYSTEM FOR MAKING PURCHASES OVER A COMPUTER NETWORK

(75) Inventor: Douglas W. King, Santa Maria, CA (US)

(73) Assignee: Rysix Holdings, LLC, Chicago, IL (US)

( * ) Notice: Subject to any disclaimer, the term of this patent is extended or adjusted under 35 U.S.C. 154(b) by 0 days.

(21) Appl. No.: 09/391,285

(22) Filed: Sep. 7, 1999

(51) Int. Cl.
*G06Q 40/00* (2006.01)
(52) U.S. Cl. .......................... 705/39; 705/26; 705/27; 705/37; 705/38; 705/40; 705/41
(58) Field of Classification Search ................ 705/1, 705/14, 26, 27, 53, 64, 67, 72, 42, 43, 44, 705/39, 70, 75, 77, 78, 79, 41, 37, 38, 40; 235/379, 380; 380/24, 25, 52
See application file for complete search history.

(56) References Cited

U.S. PATENT DOCUMENTS

| | | | | |
|---|---|---|---|---|
| 4,822,985 | A | | 4/1989 | Boggan et al. ............. 235/380 |
| 4,870,259 | A | | 9/1989 | Boggan et al. ............. 235/380 |
| 4,908,521 | A | | 3/1990 | Boggan et al. ............. 235/380 |
| 4,943,707 | A | | 7/1990 | Boggan ..................... 235/380 |
| 5,177,342 | A | | 1/1993 | Adams ...................... 235/379 |
| 5,220,501 | A | * | 6/1993 | Lawlor et al. ............... 705/40 |
| 5,351,296 | A | * | 9/1994 | Sullivan ..................... 705/70 |
| 5,371,797 | A | * | 12/1994 | Bocinsky, Jr. ............... 705/70 |
| 5,671,279 | A | * | 9/1997 | Elgamal ..................... 705/79 |
| 5,703,344 | A | | 12/1997 | Bezy et al. ................. 235/379 |
| 5,708,422 | A | * | 1/1998 | Blonder et al. ............. 235/379 |
| 5,809,143 | A | * | 9/1998 | Hughes ....................... 380/24 |
| 5,815,577 | A | * | 9/1998 | Clark .......................... 380/52 |
| 5,822,737 | A | * | 10/1998 | Ogram ........................ 705/26 |
| 5,826,245 | A | * | 10/1998 | Sandberg-Diment .......... 705/44 |
| 5,903,721 | A | * | 5/1999 | Sixtus ......................... 703/78 |
| 5,903,878 | A | * | 5/1999 | Talati et al. ................. 705/26 |
| 5,920,847 | A | | 7/1999 | Kolling et al. ............... 705/40 |
| 5,930,777 | A | * | 7/1999 | Barber ........................ 705/40 |
| 5,943,423 | A | * | 8/1999 | Muftic ........................ 705/67 |

(Continued)

FOREIGN PATENT DOCUMENTS

WO     WO 0075843    * 12/2000

(Continued)

OTHER PUBLICATIONS

Zgodzinski, "Click here to pay", Internet World, v8 n9 p. 60, Sep. 1997.*

(Continued)

*Primary Examiner*—Nga Nguyen
(74) *Attorney, Agent, or Firm*—Baker & Hostetler LLP

(57) ABSTRACT

A method of and system for making purchases over a computer network using an ATM card or the like is provided. In accordance with the invention, a consumer transmits his ATM card number over the network to an on-line merchant. The on-line merchant then forwards the ATM card number to a third party contractor, such as a bank, that will oversee and authorize the transaction. Simultaneously or thereafter, the consumer transmits his PIN over the network to the third party contractor, who verifies that the ATM card number and PIN are valid.

92 Claims, 4 Drawing Sheets

U.S. PATENT DOCUMENTS

| | | | | |
|---|---|---|---|---|
| RE36,365 E | | 11/1999 | Levine et al. | 235/380 |
| 6,000,832 A | * | 12/1999 | Franklin et al. | 700/232 |
| 6,014,636 A | * | 1/2000 | Reeder | 705/17 |
| 6,016,476 A | * | 1/2000 | Maes et al. | 705/44 |
| 6,049,785 A | * | 4/2000 | Gifford | 705/39 |
| 6,052,675 A | * | 4/2000 | Checchio | 705/44 |
| RE36,788 E | | 7/2000 | Mansvelt et al. | 235/379 |
| 6,098,053 A | * | 8/2000 | Slater | 705/44 |
| 6,105,008 A | * | 8/2000 | Davis et al. | 705/41 |
| RE37,122 E | | 4/2001 | Levine et al. | 235/380 |
| 6,247,129 B1 | * | 6/2001 | Keathley et al. | 70/26 |
| 6,270,011 B1 | * | 8/2001 | Gottfried | 235/379 |
| 6,282,522 B1 | | 8/2001 | Davis et al. | 705/41 |
| 6,285,991 B1 | | 9/2001 | Powar | 705/76 |
| 6,408,284 B1 | | 6/2002 | Hilt et al. | 705/40 |

FOREIGN PATENT DOCUMENTS

| | | | |
|---|---|---|---|
| WO | WO 0103083 | * | 1/2001 |
| WO | WO 0111513 | * | 2/2001 |

OTHER PUBLICATIONS

"Internet Commerce: Show Me the Money", Credit Card Management, v10 n1 p. 68, Apr. 1997.*

"Hard Sell: security gaps stall Internet Shopping", Communications Week International, n141 p. 18, Mar. 1995.*

Giles, "Electronic Commerce", Network VAR, v5 n5 p. 26, May 1997.*

Oberndorf, "Virtually secure", Catalog Age, v14 n7 p. 6, Jul. 1997.*

"Dacom to offer electronic payment service for Internet Shoppers", The Korea Herald, p. 7, Oct. 1997.*

D'Amico, "Dutch secure payment with SET", Computerworl, v32 n31 p. 42, Aug. 1998.*

* cited by examiner

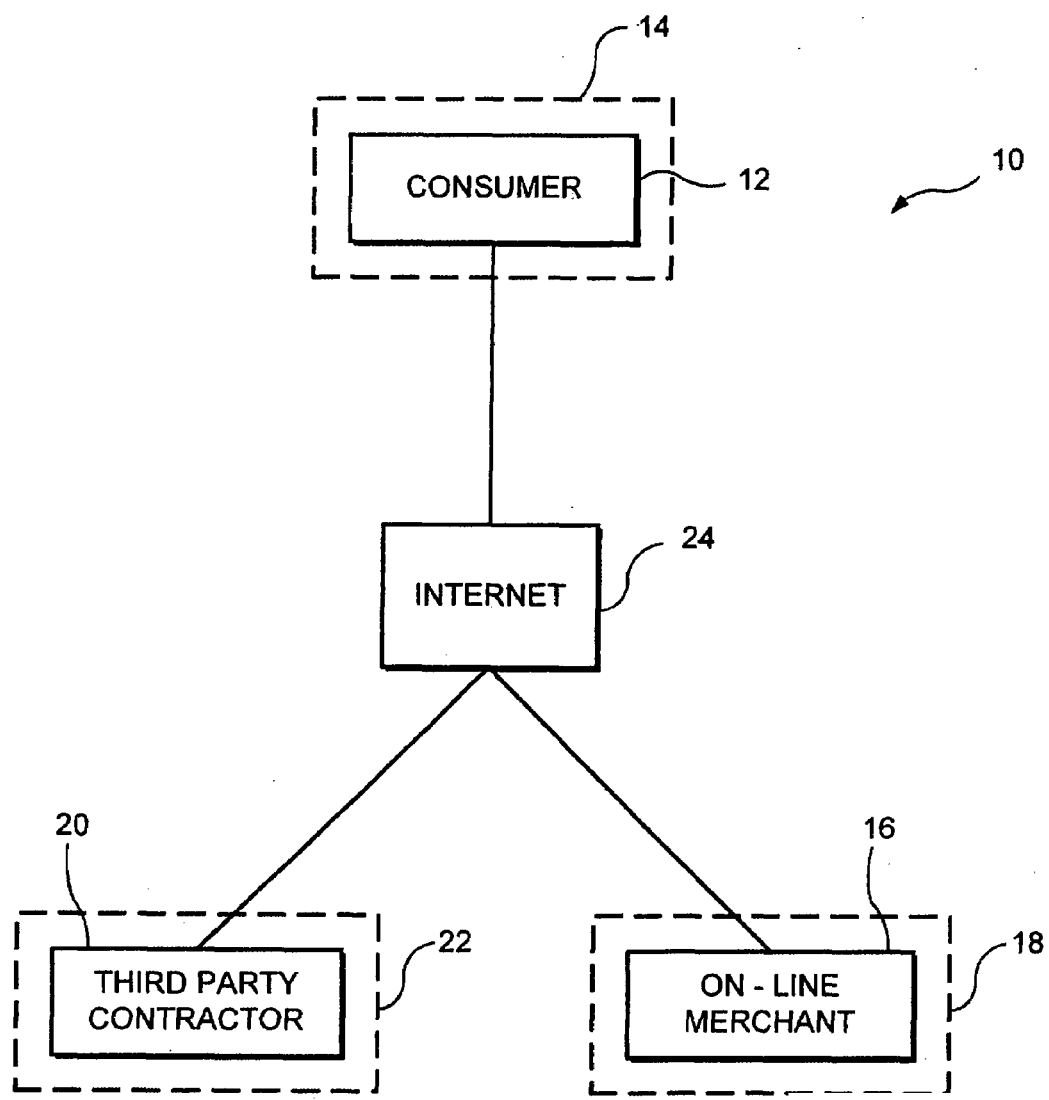
F I G. 1

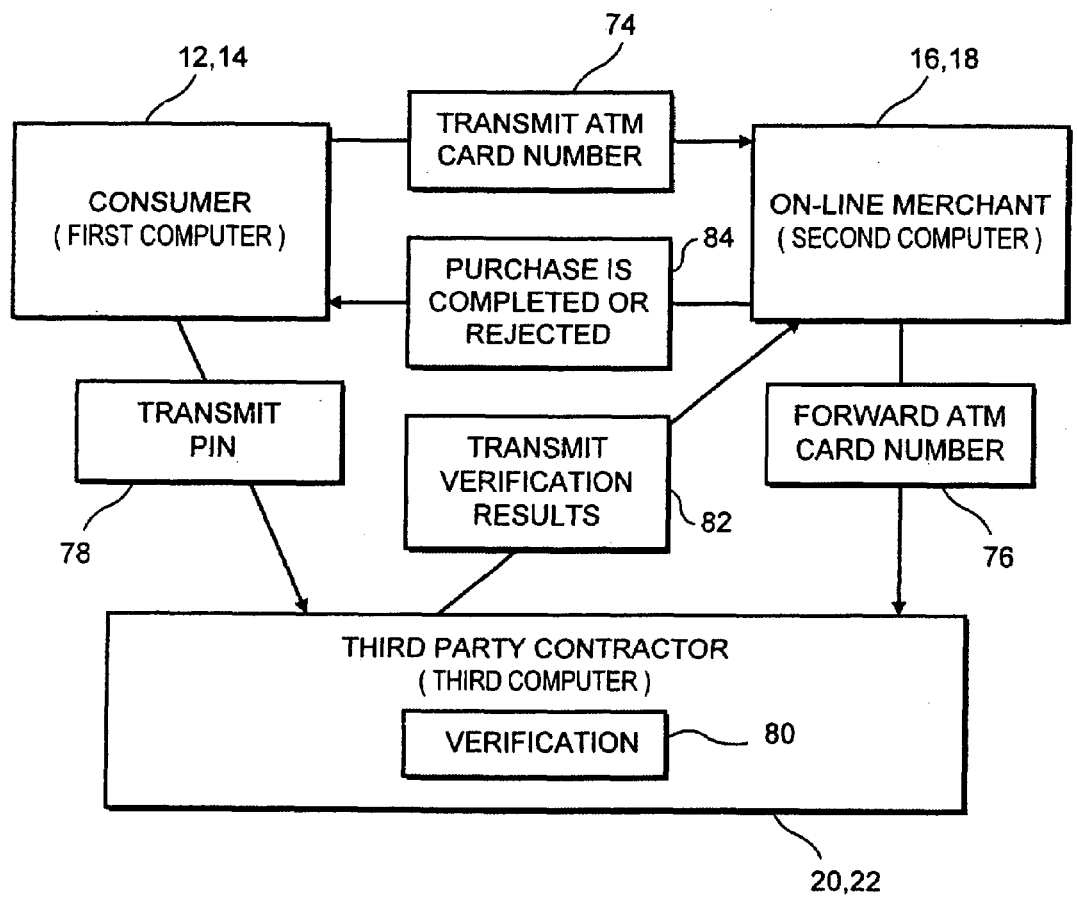
F I G. 4

METHOD OF AND SYSTEM FOR MAKING PURCHASES OVER A COMPUTER NETWORK

REFERENCE TO COMPUTER PROGRAM LISTING APPENDIX

An original and duplicate compact disc each containing two computer programs, APPENDIXA.txt (5,229 bytes, created Apr. 4, 2001) and APPENDIXB.txt (11,243 bytes, created Apr. 4, 2001), have been submitted pursuant to 37 C.F.R. § 1.96. Both computer programs are incorporated herein by reference as though fully set forth herein. The copyrights in APPENDIXA.txt and APPENDIXB.txt are owned by ePacific, Inc. and no express or implied license is granted herein to reproduce, prepare derivative works, distribute copies, display, or otherwise use either program except as an appendix to a patent issuing hereon.

BACKGROUND OF THE INVENTION

1. Field of the Invention

The present invention generally relates to a method of and system for making purchases over a computer network and, more particularly, to a method of and system for making purchases of goods and services over the Internet or other non-secure computer network using an automated-teller-machine (ATM) card, debit card or any other card which may require a valid personal-identification-number (PIN) for transaction authorization.

2. Description of the Prior Art

The use of personal computers by consumers to purchase goods and services over the Internet via the World Wide Web and e-mail has become very popular in recent years and constitutes an ever-increasing part of the economy. In making a purchase over the Internet, the typical consumer uses a credit card or ATM card. After making his purchase selection, the consumer transmits his card information over the Internet to the on-line merchant. The on-line merchant then contacts the issuing bank to verify the card information and obtain authorization to complete the transaction. Depending on the response from the bank, the on-line merchant either accepts or rejects the purchase.

Because the Internet is a non-secure (i.e., public) network, there is a danger that the consumer's credit card or ATM card information will be intercepted by a third party. If that third party is dishonest, he can make illegal charges to the credit card or, in the case of an ATM card, remove money directly from the consumer's bank account. In recent years, numerous approaches have been implemented to reduce this security risk. The most popular approach has been sophisticated encryption techniques which render the credit card or ATM card data virtually unreadable to third parties, such as 128-bit secure-sockets-layer (SSL) encryption.

When making purchases over the Internet using an ATM card, however, security considerations take on an added importance because, unlike with transactions at ATM machines, PINs are presently not used in ATM transactions on the Internet. Thus, should the ATM card number fall into the hands of an unscrupulous third party, the card-holder's entire bank account can be wiped out through fraudulent Internet transactions.

One way to overcome this problem is to require the use of PINs in ATM transactions on the Internet. This has not been possible to date, however, because on-line merchants do not have the ability to verify PINs. Additionally, it is not desirable to provide the on-line merchant with both the ATM card number and the corresponding PIN since unscrupulous employees of the on-line merchant can use the PIN to illegally access the card-holder's bank account and withdraw money therefrom.

Accordingly, it is an object of the present invention to provide a new method of and system for making purchases over the Internet using an ATM card wherein a valid PIN is required in order to obtain authorization for a given transaction. It is another object of the present invention to provide a new method of and system for making purchases over the Internet using an ATM card wherein a valid PIN is required in order to obtain authorization for a given transaction, and wherein the PIN is not supplied to the on-line merchant.

SUMMARY OF THE INVENTION

In accordance with a first aspect of the present invention, a method of making purchases over a non-secure computer network using an ATM card is provided. In accordance with said method, a consumer transmits his ATM card number over the network to an on-line merchant. The on-line merchant then forwards the ATM card number to a third party contractor, such as a bank, that will oversee and authorize the transaction. Simultaneously or thereafter, the consumer transmits his PIN over the network to the third party contractor, bypassing the on-line merchant. Having both the ATM card number and the PIN, the third party contractor verifies that the ATM card number and PIN are correct, checks for sufficiency of funds, and either authorizes or denies the transaction. The authorization or denial is communicated to the on-line merchant over the network, who either completes or rejects the purchase and so notifies the consumer.

In accordance with a second aspect of the present invention, a system for making purchases over a non-secure computer network using an ATM card is provided. The system includes first, second and third computers connected to a computer network. The first computer transmits the consumer's ATM card number over the network to the second computer, which is operated by or for the on-line merchant. The second computer forwards the ATM card number over the network to the third computer, which is operated by or for the third party contractor. Simultaneously or thereafter, the first computer transmits the consumer's PIN over the network to the third computer, bypassing the second computer. The third computer then verifies that the ATM card number and PIN are correct and that there are sufficient funds in the bank account to cover the transaction amount. The third computer then transmits the results of the verification procedure to the second computer, which forwards the results to the first computer. Depending on the verification results, the purchase is either completed or rejected.

The present invention will now be described in detail, with frequent reference being made to the drawings identified below.

BRIEF DESCRIPTION OF THE DRAWINGS

In the accompanying drawings:

FIG. 1 is a schematic diagram of the system in accordance with the present invention;

FIG. 4 is a diagram which summarizes the present invention.

DESCRIPTION OF THE PREFERRED EMBODIMENT

Figure 2:
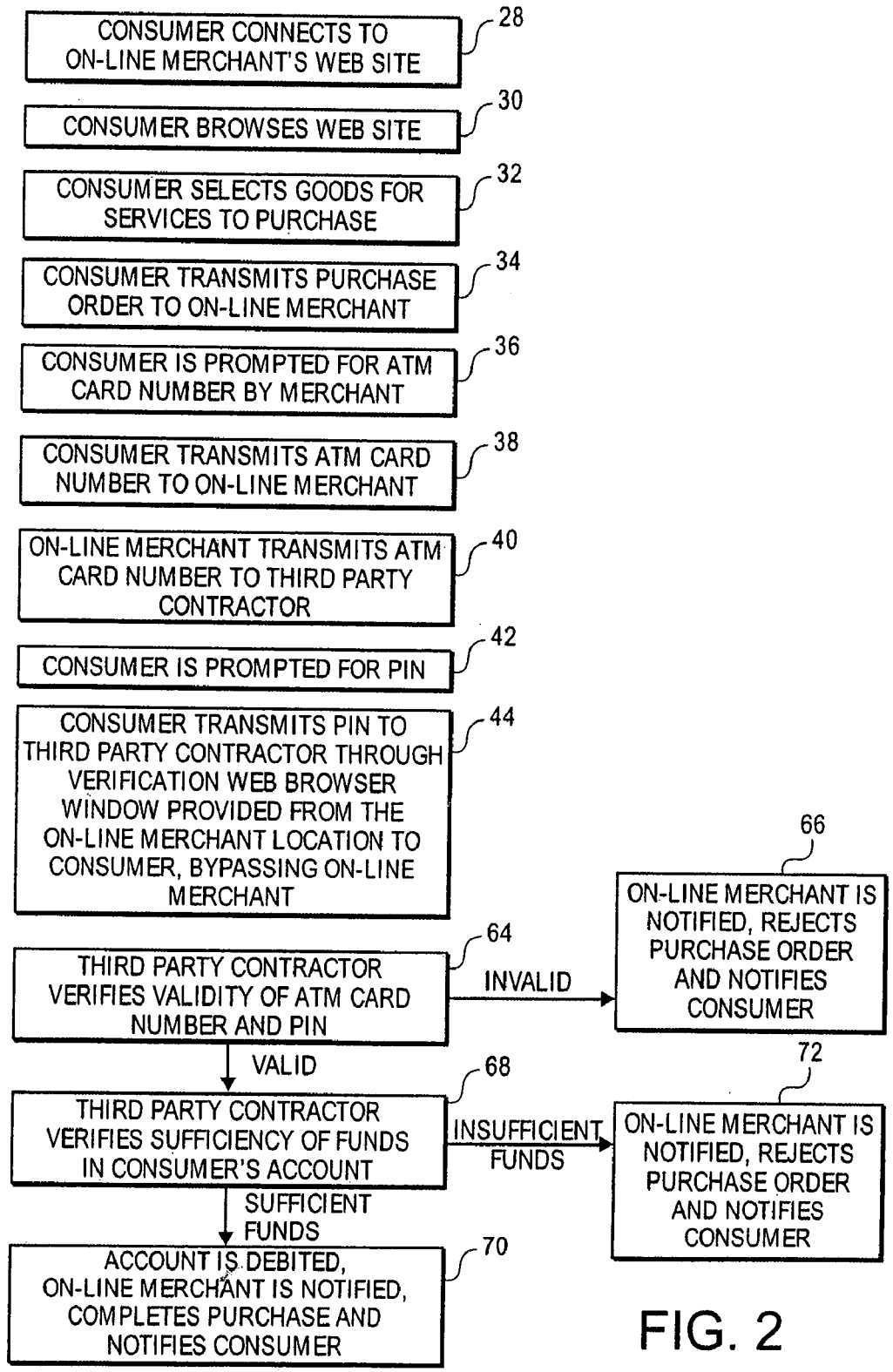
FIG. 2 is a flow chart which illustrates how the system of FIG. 1 operates.

The system 10 in accordance with the present invention is schematically shown in FIG. 1. The system 10 includes a first computer 12 at a consumer location 14, a second computer 16 at an on-line merchant location 18, and a third computer 20 at a third party contractor location 22. The three computers 12, 16, 20 are connected together over a computer network 24 which, for purposes of this discussion, is the Internet, although the present invention may be practiced on any computer network. As those of ordinary skill in the art know, the Internet 24 is a complex and amorphous computer network that comprises thousands of nodes and components and over which signals are transmitted by telephone lines, satellites and optical fibers.

The first computer 12, which will generally be located at the consumer's home or business (consumer location 14), will typically be a conventional personal computer (PC) that includes a chassis that houses a central processing unit (CPU) and supporting circuitry, as well as a floppy drive, a hard drive and an internal modem. Connected to the CPU through the chassis are a keyboard, a mouse and a monitor. The keyboard and mouse are used by the consumer to control the operation of the first computer 12 and to input information into the first computer 12. The first computer 12 will usually be coupled to the Internet via a telephone line connected to the modem, although the computer can be connected to the Internet via a high speed data transmission line. The consumer will typically connect to the Internet using an Internet service provider, such as Erols™ or America OnLine™, but may have a direct connection to the Internet.

Although a conventional PC will typically be used by the consumer, the consumer may use any type of computer that can be connected to the Internet, including a work station on a local area network, and any operating system. The particular details of the first computer 12 are largely irrelevant to the present invention. The first computer 12 merely serves as a convenient interface for the consumer to place orders for goods and services over the Internet.

Next shown in FIG. 1 is the second computer 16 which is located at the on-line merchant location 18. The second computer 16 will preferably be a more powerful machine than a personal computer, such as a workstation, although a personal computer may also be used by the on-line merchant. Again, the particular details of the second computer 16 are largely irrelevant to the present invention.

Typically, the second computer 16 will be a Web server (a computer that provides direct access to the World Wide Web on the Internet and includes the necessary hardware, operating system, Web server software, TCP/IP protocols and Web site content) owned and operated by the on-line merchant or by an Internet service provider with whom the on-line merchant has contracted. For purposes of this discussion, the on-line merchant location 18 refers to the location of the second computer 16, and not necessarily the actual physical location of the on-line merchant.

Preferably, the second computer 16 will be running Windows NT™ 4.0, using Internet Information Server™ 4.0 and Commerce Server™ 3.0. The CPU of the second computer 16 must have acceptable power and should have at least 64 megabytes of RAM.

The second computer 16 will typically have an on-line catalog in memory which can be accessed and browsed by the consumer over the Internet 24 through an appropriate graphical use interface (GUI) supplied by the on-line merchant.

Next shown in FIG. 1 is the third computer 20 which is located at the third party contractor location 22. The third party contractor is an independent, insured organization, such as a bank, that has contracted with the on-line merchant to provide ATM services. Although the third computer 20 can be a personal computer, as with the second computer 16 it will preferably be a much more powerful machine, such as a workstation. The third computer 20 is likewise preferably a Web server owned and operated by the third party contractor or by an Internet service provider with whom the third party contractor has contracted. The third party contractor location 22 refers to the location of the third computer 20 and not necessarily the actual physical location of the third party contractor. As with the first and second computers 12, 16, the particular details of the third computer 20 are largely irrelevant to the present invention, so long as the third computer 20 is capable of performing the functions described herein. Preferably, the third computer is Compaq ProLiant™ server running at 500 MHZ with 128 MB RAM and using Windows NT™ 4.0.

The flow chart 26 provided in FIG. 2 illustrates how the system 10 operates. As shown in block 28, the consumer initially establishes a connection over the Internet between the first computer 12 and the second computer 16 by accessing the on-line merchant's Web site using a commercially available browser, such as Internet Explorer™ or Netscape Navigator™. Then, as shown in blocks 30 and 32, using a GUI supplied by the on-line merchant, the consumer browses the on-line catalog, selecting which goods and/or services he wishes to purchase. Once the consumer makes his selection and is ready to place an order, the consumer transmits a purchase order message over the Internet to the on-line merchant (block 34).

The consumer is then prompted for his payment information, as indicated in block 36, which for purposes of the present discussion is an ATM card number and expiration date, although the payment information can include additional data such as the consumer's name and address. The consumer then transmits his payment information over the Internet to the on-line merchant, as indicated in block 38. As used herein, the term "ATM card" includes bank cards, debit cards and any other cards for which the issuing bank or organization may require a valid PIN for use. The payment information is transmitted over the Internet using an encrypted connection, such as 128-bit encryption SSL.

When the on-line merchant receives the ATM card number, or earlier, the second computer 16 creates a unique session identifier by combining the consumer's IP address, which uniquely identifies the consumer, with a date/time stamp. The ATM card number is then forwarded, or echoed, over the Internet by the second computer 16 to the third computer 20 at the third party contractor location 22 (block 40), along with the unique session identifier, a merchant id which uniquely identifies the on-line merchant, a terminal id which identifies the terminal being used by the on-line merchant, the expiration date of the ATM card and the purchase price. This data package is stored in memory on the third computer in a queue. Once again, 128-bit encryption SSL is preferably used.

The data package transmitted by the second computer 16 to the third computer 20 may be transmitted in ISO 8583 format. ISO 8583 is a messaging standard established by the International Standards Organization for financial transaction card oriented messages which is used by all banks and credit card companies and which is well known to those of ordinary skill in the art.

A sample computer program written in Java which creates the unique session identifier and formats the data package is provided on the compact disc referenced above as APPENDIXA.txt. The format used in APPENDIXA.txt is a simplified format which uses numbered data fields each corresponding to a data field in the ISO 8583 format. This program is designed to run as an Active Server Page on Internet Server 4.0 under Windows NT 4.0, although the program can be used on other platforms and programming environments, and can readily be implemented by one of ordinary skill in the art.

Simultaneously or soon thereafter, the second computer executes a hyperlink to the third computer and the consumer is prompted by the third computer to input his PIN (block 42). The consumer inputs his PIN into the first computer 12 and transmits it over the Internet to the third computer 20 (block 44). The connection between the first computer 12 and third computer 20 is encrypted and independent of the connection between the first computer 12 and the second computer 16 so that the on-line merchant is never in possession of the PIN. As with the second computer 16, the first computer 12 transmits the unique session identifier, the merchant id, the terminal id, the expiration date of the ATM card and the purchase price to the third computer 20 along with the PIN in a data package.

Figure 3:
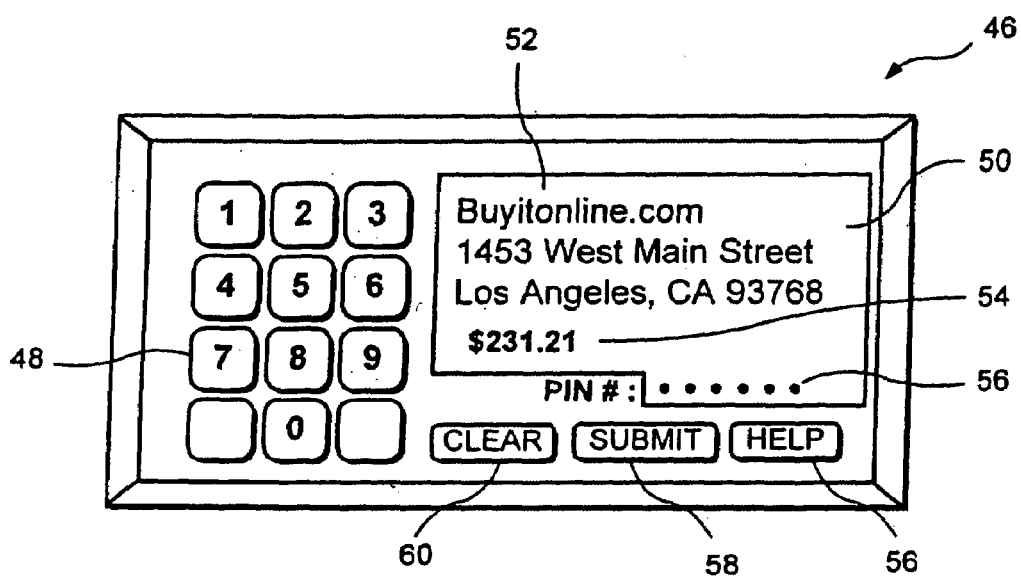
FIG. 3 shows a possible graphical user interface which can be used to enable the consumer to enter and transmit his PIN to the third party contractor.

FIG. 3 shows a typical GUI 46 which may be supplied by the third-party contractor and which pops up on the consumer's screen to allow the consumer to enter his PIN and transmit it to the third party contractor. As is clear from FIG. 3, the GUI 46 emulates an actual ATM machine and includes a simulated key pad 48 and a screen 50. The screen 50 indicates the on-line merchant's name and mailing address 52 and the purchase price 54. Using his mouse, the consumer inputs his PIN, as shown by the series of dots 56. By pressing the SUBMIT button 58, the PIN number is transmitted to the third party contractor. If the consumer makes a mistake, he presses the CLEAR button 60 and re-types his PIN. If the consumer needs help from the third party contractor, he simply presses the HELP button 62, which causes a help menu provided by the third party contractor to pop up on the screen, which may then be navigated by the consumer.

The third computer 20 next verifies that the ATM card number and PIN are valid (block 64). Because the third-party contractor may be overseeing multiple transactions at any given time, the third computer 20 must synchronize the data packages received from the first and second computers 12, 16. To do this, the third computer 20 matches the unique session identifier, the merchant id, the terminal id, the expiration date of the ATM card and the purchase price fields contained in the data packages received from the first and second computers 12, 16. A sample computer program for synchronizing the messages received from the first and second computers 12, 16 is provided on the compact disc referenced above as APPENDIXB.txt. The program is written in C++ and can readily be implemented by one of ordinary skill in the art. All of the forgoing data fields must match in order for the transaction to take place. For security reasons, a two minute window for matching is preferably implemented. If there is no match within the two minute window, the transaction is aborted.

Once the data packages from the first and second computers 12, 16 are synchronized by the third computer 20, the third computer checks the ATM card number and PIN. If the ATM card number and PIN are invalid, the third computer 20 so, informs the second computer 16 and the on-line merchant rejects the purchase order and notifies the consumer (block 66). If the ATM card number and PIN are valid, the third computer 20 checks to see whether there are sufficient funds to cover the purchase price 56 (block 68). If there are sufficient funds in the account, the third computer transmits an authorization message to the second computer, debits the consumer's account, the purchase is completed and the consumer is notified (block 70). If there are insufficient funds, a rejection message is transmitted, the on-line merchant rejects the purchase and the consumer is notified (block 72).

If the ATM card was issued by the third party contractor, the verification steps (blocks 64 and 68) may be done by simply accessing an internal database in or connected to the third computer 20. If, however, the ATM card was issued by another bank, then the third party contractor must verify the card information by contacting the issuing bank, either directly over a secure line, through a private ATM network, such as CIRRUS, or through any other available avenue.

The present invention is briefly and concisely summarized in FIG. 4. First, the consumer (first computer) transmits his ATM card number over the network to the on-line merchant (second computer) (block 74). Second, the on-line merchant forwards the ATM card number over the network to the third party contractor (third computer) (block 76). Third, the consumer transmits his PIN over the network to the third party contractor (block 78). As FIG. 4 indicates, the on-line merchant is completely bypassed and never receives the PIN. Fourth, the third party contractor verifies the ATM card number and PIN and checks for sufficiency of funds (block 80). Fifth, the third party contractor transmits the results of the verification process over the network to the on-line merchant (block 82). And sixth, the on-line merchant forwards the results over the network to the consumer, either completing or rejecting the purchase, depending on the verification results (block 84).

Thus, in accordance with the foregoing the objects of the present invention are achieved. Modifications to the present invention would be obvious to those of ordinary skill in the art, but would not bring the invention so modified beyond the scope of the appended claims.

What is claimed is:

1. A method of making purchases over a computer network using an account number that identifies a consumer's account from which funds will be withdrawn to pay a purchase price and an authorization number associated with said account number which, when used with said account number, enables withdrawal of funds from said account, said method comprising the steps of:

transmitting said account number over said network from a consumer location to an on-line merchant location;

forwarding said account number over said network from said on-line merchant location to a third party contractor location;

initiating a verification connection between said consumer location and said third party contractor location, said verification connection including a verification web browser window provided from said on-line merchant location to said consumer location to initiate said verification connection between said consumer location and said third party contractor location, said verification connection being independent of, and bypassing, said on-line merchant location;

transmitting said authorization number over said verification connection from said consumer location to said third party contractor location using said verification web browser window, bypassing said on-line merchant location; and after said account number and said authorization number are received at said third party contractor location, verifying the validity of said account number and said authorization number.

2. The method according to claim 1 wherein said account number and said authorization number are transmitted over said network via encrypted connections.

3. The method according to claim 1 wherein said network is the Internet.

4. The method according to claim 1 including the additional step of checking at said third party contractor location whether said account has sufficient funds to cover said purchase price.

5. The method according to claim 1 including the additional step of transmitting a signal from said third party contractor location to said on-line merchant location indicating whether said account number and said authorization number are valid.

6. The method according to claim 4 including the additional step of transmitting a signal from said third party contractor location to said on-line merchant location indicating whether there are sufficient funds in said account to cover said purchase price.

7. The method according to claim 1 including the additional step of transmitting a signal from said on-line merchant location to said consumer location indicating whether said purchase has been authorized.

8. The method according to claim 1 wherein said account number is an ATM card number and said authorization number is a PIN associated with said ATM card number.

9. The method according to claim 1 wherein said consumer location is a consumer computer, said on-line merchant location is an on-line merchant computer, and said third party contractor location is a third party contractor computer.

10. The method according to claim 1, further comprising the step of:

initiating a communication connection of said network between the consumer location and the third party contractor location, wherein the initiating is performed from the on-line merchant location.

11. The method of claim 1 further comprising synchronizing, at said third party contractor location, said account number with said authorization number to determine a match of said account number with said authorization number.

12. The method of claim 1 wherein the verification web browser window is launched by a hyperlink provided from said on-line merchant location.

13. A system for making purchases over a computer network using an account number that identifies a consumer's account from which funds will be withdrawn to pay a purchase price and an authorization number associated with said account number which, when used with said account number, enables withdrawal of finds from said account, said system comprising:

a first computer at a consumer location, said first computer being connected to said network;

a second computer at an on-line merchant location, said second computer being connected to said network; and a third computer at a third party contractor location, said third computer being connected to said network;

wherein said account number is transmitted from said first computer to said second computer over said network;

wherein said account number is forwarded from said second computer to said third computer over said network;

wherein a verification connection is initiated between said consumer location and said third party contractor location by said second computer, said verification connection including a verification web browser window provided from said on-line merchant location to said consumer location to initiate said verification connection between said consumer location and said third party contractor location, said verification connection being independent of, and bypassing, said on-line merchant location;

wherein said authorization number is transmitted from said first computer to said third computer over said verification connection using said verification web browser window, bypassing said second computer;

and wherein said third computer, after receiving said account number and said authorization number, verifies the validity of said account number and said authorization number.

14. The system according to claim 13 wherein said account number and said authorization number are transmitted over said network via encrypted connections.

15. The system according to claim 13 wherein said network is the Internet.

16. The system according to claim 13 wherein said third computer checks whether said account has sufficient funds to cover said purchase price.

17. The system according to claim 13 wherein said third computer notifies said second computer whether said account number and said authorization number are valid.

18. The system according to claim 16 wherein said third computer notifies said second computer whether there are sufficient funds in said account to cover said purchase price.

19. The system according to claim 13 wherein said second computer notifies said first computer whether said purchase is authorized.

20. The system according to claim 13 wherein said account number is an ATM card number and said authorization number is a PIN associated with said ATM card number.

21. The system according to claim 13, wherein said second computer initiates a communication connection between the first computer and the third computer.

22. The system of claim 13 wherein said account number is synchronized with said authorization number to determine a match of said account number with said authorization number.

23. The system of claim 13 wherein the verification web browser window is launched by a hyperlink provided from said on-line merchant location.

24. A method of authorizing a purchase to be made over a computer network using an account number that identifies a consumer's account from which funds will be withdrawn to pay a purchase price and an authorization number associated with said account number which, when used with said account number, enables withdrawal of funds from said account, said method comprising the steps:

receiving at a third party contractor location said account number transmitted over said network from an on-line merchant location;

initiating a verification connection between a consumer location and said third party contractor location, said verification connection including a verification web browser window provided from said on-line merchant location to said consumer location to initiate said verification connection between said consumer location and said third party contractor location, said verification connection being independent of, and bypassing, said on-line merchant location;

receiving at said third party contractor location said authorization number transmitted over said verification connection from said consumer location using said verification web browser window, bypassing said on-line merchant location; and after receiving said account number and said authorization number at said third party contractor location, verifying the validity of said account number and said authorization number.

25. The method according to claim 24 wherein said network is the Internet.

26. The method according to claim 24 including the additional step of checking at said third party contractor location whether said account has sufficient funds to cover said purchase price.

27. The method according to claim 24 including the additional step of transmitting a signal from said third party contractor location to said on-line merchant location indicating whether said account number and said authorization number are valid.

28. The method according to claim 26 including the additional step of transmitting a signal from said third party contractor location to said on-line merchant location indicating whether there are sufficient finds in said account to cover said purchase price.

29. The method according to claim 24 wherein said account number is an ATM card number and said authorization number is a PIN associated with said ATM card number.

30. The method according to claim 24 wherein said consumer location is a consumer computer, said on-line merchant location is an on-line merchant computer, and said third party contractor location is a third party contractor computer.

31. The method according to claim 24, further comprising the step of:
initiating a communication connection of said network between a consumer location and a third party contractor location, wherein the initiating is performed from an on-line merchant location.

32. The method of claim 24 further comprising synchronizing, at said third party contractor location, said account number with said authorization number to determine a match of said account number with said authorization number.

33. The method of claim 24 wherein the verification web browser window is launched by a hyperlink provided from said on-line merchant location.

34. A system for authorizing a purchase to be made over a computer network using an account number that identifies a consumer's account from which funds will be withdrawn to pay a purchase price and an authorization number associated with said account number which, when used with said account number, enables withdrawal of funds from said account, said system comprising:
a computer connected to said network;
said computer being configured to receive said account number transmitted over said network from an on-line merchant's computer, connect to a consumer's computer over a verification connection initiated by said on-line merchant's computer, said verification connection including a verification web browser window provided from said on-line merchant's computer to said consumer's computer to initiate said verification connection between said consumer's computer and said computer, said verification connection being independent of, and bypassing, said on-line merchant's computer, receive said authorization number transmitted over said network from said consumer's computer using said verification web browser window bypassing said on-line merchant's computer, and, after receiving said account number and authorization number, verify the validity of said account number and said authorization number.

35. The system according to claim 34 wherein said network is the Internet.

36. The system according to claim 34 wherein said computer is configured to determine whether said account has sufficient finds to cover said purchase price.

37. The system according to claim 34 wherein said computer is configured to notify said on-line merchant's computer whether said account number and said authorization number are valid.

38. The system according to claim 36 wherein said computer is configured to notify said on-line merchant's computer whether there are sufficient funds in said account to cover said purchase price.

39. The system according to claim 34 wherein said account number is an ATM card number and said authorization number is a PIN associated with said ATM card number.

40. The system according to claim 34, wherein said computer is configured to receive a network communication connection to the consumer computer that is initiated by the on-line merchant's computer.

41. The system of claim 34 wherein said computer is configured to synchronize said account number with said authorization number to determine a match of said account number with said authorization number.

42. The system of claim 34 wherein the verification web browser window is launched by a hyperlink provided from said on-line merchant's computer.

43. A method of making purchases over the Internet comprising the steps of:
transmitting an ATM card number which will be used to pay a purchase price over the Internet, from a web browser on a consumer's computer to an on-line merchant's web site;
forwarding said ATM card number over the Internet from said on-line merchant's web site to a verification computer;
initiating a verification connection between said consumer's computer and said verification computer, said connection including a verification web browser window provided from said on-line merchant's web site to the consumer's computer to initiate the verification connection between said consumer's computer and said verification computer, said verification connection being independent of, and bypassing, said merchant's web site;
receiving said PIN into said verification web browser window on said consumer's computer; and
transmitting said PIN using said verification web browser window, over said verification connection from said consumer's computer to said verification computer;
determining using said verification computer whether said ATM card number and said PIN are valid; and transmitting a message over the Internet from said verification computer to said on-line merchant's web site indicating whether said ATM card number and PIN are valid.

44. The method of claim 43 wherein the forwarding comprises forwarding to the verification computer a session identifier that includes an electronic address for the consumer's computer, which is forwarded with the ATM card number.

45. The method according to claim 43, further comprising the step of:
 initiating a communication connection of said network between the consumer's computer and the verification computer, wherein the initiating is triggered from the on-line merchant's website.

46. The method according to claim 43, wherein the first and second data sets each also include data identifying said on-line merchant.

47. The method according to claim 43, wherein the first and second data sets each also include the expiration date of the ATM card.

48. The method according to claim 43, wherein the first and second data sets each also include data identifying the terminal of the on-line merchant.

49. The method according to claim 43, wherein the first and second data sets each also include the purchase price.

50. The method according to claim 43, wherein the first and second data sets each include a session identifier.

51. The method according to claim 43, wherein the verification web browser window is launched by a hyperlink provided from said merchant's web site.

52. The method of claim 43 further comprising synchronizing, at said verification computer, said ATM card number with said PIN to determine a match of said ATM card number with said PIN.

53. A system for making purchases over the Internet comprising:
 a consumer computer connected to the Internet having a web browser;
 an on-line merchant's web site connected to the Internet; and
 a verification computer connected to the Internet;
 said consumer computer being configured to transmit over the Internet, using said web browser, (1) an ATM card number which will be used to pay a purchase price to said on-line merchant's web site and (2) a PIN associated with said ATM card number to said verification computer in response to a query from said verification computer,
 said on-line merchant's web site being configured to forward said ATM card number to said verification computer over the Internet and initiate a verification connection between said consumer's computer and said verification computer, said connection including a verification web browser window provided from said on-line merchant's web site to the consumer's computer to initiate the verification connection between said consumer's computer and said verification computer, said verification connection being independent of, and bypassing, said merchant's web site; and
 said verification computer being configured to receive from said consumer's computer said PIN using said verification web browser window over said verification connection, determine the validity of said ATM card number and said PIN, and transmit a message over the Internet to said on-line merchant's web site indicating whether said ATM card number and PIN are valid.

54. The system of claim 53 wherein the on-line merchant's web site is configured to generate a session identifier that includes an electronic address for the consumer's computer and configured to forward the ATM account number with the session identifier to the verification computer.

55. The system according to claim 53, wherein said on-line merchant's web site is also configured to initiate a verification-computer Internet connection between the consumer computer and the verification computer.

56. The system of claim 53 wherein said verification computer is configured to synchronize said ATM card number with said PIN to determine a match of said ATM card number with said PIN.

57. The system of claim 53 wherein the verification web browser window is launched by a hyperlink provided from said on-line merchant's web site.

58. A method of authorizing a purchase to be made over the Internet comprising the steps:
 receiving at a verification computer a consumer's ATM card number which will be used to pay a purchase price transmitted over the Internet from an on-line merchant's web site;
 initiating a verification connection between a consumer computer and said verification computer, said connection including a verification web browser window provided from said on-line merchant's web site to said consumer computer to initiate the verification connection between said consumer computer and said verification computer, said verification connection being independent of, and bypassing, said on-line merchant's web site;
 receiving at said verification computer said PIN transmitted using said verification web browser window over said verification connection from said consumer computer;
 verifying the validity of said ATM card number and said PIN using said verification computer; and
 transmitting a message over the Internet from said verification computer to said on-line merchant's web site indicating whether said ATM card number and PIN are valid.

59. The method according to claim 58, further comprising the step of:
 receiving at the verification computer an Internet communication connection to a merchant provided window on a consumer's computer.

60. The method of claim 58 further comprising synchronizing, at said verification computer, said ATM card number with said PIN to determine a match of said ATM card number with said PIN.

61. The method of claim 58 wherein the verification web browser window is launched by a hyperlink provided from said on-line merchant's web site.

62. A system for authorizing a purchase to be made over the Internet comprising:
 a verification computer connected to the Internet;
 said verification computer being configured to receive a consumer's ATM card number which will be used to pay a purchase price transmitted over the Internet from an on-line merchant's web site, connect to a consumer computer using a verification connection between said consumer computer and said verification computer, said connection including a verification web browser window provided from said on-line merchant's web site to said consumer computer to initiate the verification connection between said consumer computer and said verification computer, said verification connection being independent of, and bypassing, said on-line merchant's web site, receive said PIN transmitted using said verification web browser window over said verification connection from said consumer computer, verify the validity of said ATM card number and PIN, and transmit a message over the Internet to said on-line merchant's web site indicating whether said ATM card number and PIN are valid.

63. The system according to claim 62, wherein said verification computer is configured to be connected to a merchant-supplied Internet communication window on a consumer's computer which is private to the verification computer.

64. The system of claim 62 wherein said verification computer is configured to synchronize said ATM card number with said PIN to determine a match of said ATM card number with said PIN.

65. The system of claim 62 wherein the verification web browser window is launched by a hyperlink provided from said on-line merchant's web site.

66. A system for making purchases over a computer network using an account number that identifies a consumer's account from which funds will be withdrawn to pay a purchase price and an authorization number associated with said account number which, when used with said account number, enables withdrawal of funds from said account, said system comprising:
   means for transmitting said account number over said network from a consumer location to an on-line merchant location;
   means for forwarding said account number over said network from said on-line merchant location to a third party contractor location;
   means for initiating a verification connection between said consumer location and said third party contractor location, said verification connection including a verification web browser window provided from said on-line merchant location to said consumer location to initiate the verification connection between said consumer location and said third party contractor location, said verification connection being independent of, and bypassing, said on-line merchant location;
   means for transmitting said authorization number over said verification connection from said consumer location to said third party contractor location using said verification web browser window, bypassing said on-line merchant location; and
   means for verifying the validity of said account number and said authorization number after said account number and said authorization number are received at said third party contractor location.

67. The system according to claim 66, further comprising:
   means for initiating a communication connection of said network between the consumer location and the third party contractor location, wherein the initiating is performed from the on-line merchant location.

68. The system of claim 66 wherein said means for verifying synchronizes said account number with said authorization number to determine a match of said account number with said authorization number.

69. The system of claim 66 wherein the verification web browser window is launched by a hyperlink provided from said on-line merchant location.

70. A system for authorizing a purchase to be made over a computer network using an account number that identifies a consumer's account from which finds will be withdrawn to pay a purchase price and an authorization number associated with said account number which, when used with said account number, enables withdrawal of funds from said account, said system comprising:
   means for receiving at a third party contractor location said account number transmitted over said network from an on-line merchant location;
   means for connecting to a consumer location using a verification connection between said consumer location and said third party contractor location, said verification connection including a verification web browser window provided from said on-line merchant location to said consumer location to initiate the verification connection between said consumer location and said third party contractor location, said verification connection being independent of, and bypassing, said on-line merchant location;
   means for receiving at said third party contractor location said authorization number transmitted over said verification connection from said consumer location using said verification web browser window, bypassing said on-line merchant location; and
   means for verifying the validity of said account number and said authorization number after said account number and said authorization number are received at said third party contractor location.

71. The system according to claim 70, further comprising:
   means for initiating a communication connection of said network between a consumer location and the third party contractor location, wherein the initiating is performed from the on-line merchant location.

72. The system of claim 70 wherein said means for verifying synchronizes said account number with said authorization number to determine a match of said account number with said authorization number.

73. The system of claim 70 wherein the verification web browser window is launched by a hyperlink provided from said on-line merchant location.

74. A method of making purchases over a computer network using an account number that identifies a consumer's account from which funds will be withdrawn to pay a purchase price and an authorization number associated with said account number which, when used with said account number, enables withdrawal of funds from said account, said method comprising the steps of:
   receiving by an on-line merchant location said account number over said network from a consumer location;
   forwarding said account number over said network from said on-line merchant location to a third party contractor location;
   receiving an approval or disapproval of the withdrawal of said funds at said on-line merchant, the approval or disapproval being determined after said on-line merchant location initiates a verification connection between said consumer location and said third party contractor location, said verification connection including a verification web browser window provided from said on-line merchant location to said consumer location to initiate the verification connection between said consumer location and said third party contractor location, said verification connection being independent of, and bypassing, said on-line merchant location, and receives said authorization number, bypassing said on-line merchant location, over said verification connection from said consumer location using said verification web browser window, and verifies the validity of said account number and said authorization number; and responding to the approval or disapproval by providing or not providing a good or service, respectively.

75. The method according to claim 74, further comprising the step of:
    initiating a communication connection of said network between the consumer location and the third party contractor location, wherein the initiating is performed from the on-line merchant location.

76. The method according to claim 74, wherein the authorization number is a user-selected authorization number.

77. The method of claim 74 further comprising synchronizing, at said third party contractor location, said account number with said authorization number to determine a match of said account number with said authorization.

78. The method of claim 74 wherein the verification web browser window is launched by a hyperlink provided from said on-line merchant location.

79. A system for authorizing a purchase to be made over a computer network using an account number that identifies a consumer's account from which funds will be withdrawn to pay a purchase price and an authorization number associated with said account number which, when used with said account number, enables withdrawal of funds from said account, said system comprising:
    a purchase facilitating computer connected to said network;
    said purchase facilitating computer being configured to transmit a query for said account number over said network to a consumer's computer, to initiate a verification connection between a consumer computer and an account authorization computer, said verification connection including a verification web browser window provided from purchase facilitating computer to said consumer computer to initiate the verification connection between said consumer computer and said account authorization computer, said verification connection being independent of, and bypassing, said purchase facilitating computer, to receive said account number over said network from the consumer's computer, to forward said account number over said network to said account authorization computer, to receive an approval or disapproval of the withdrawal of said funds from the account authorization computer, the approval or disapproval being determined after said account authorization receives said authorization number using said verification web browser window, bypassing said purchase facilitating computer, over said verification connection from said consumer's computer, and verifies the validity of said account number and said authorization number, and to respond to the approval or disapproval by providing or not providing a good or service, respectively.

80. The method according to claim 79, further comprising the step of:
    initiating a communication connection of said network between the consumer's computer and the account authorization computer, wherein the initiating is performed by the purchase facilitating computer.

81. The system according to claim 79, wherein the authorization number is a user-selected authorization number.

82. The system of claim 79 wherein said account authorization computer is configured to synchronize said account number with said authorization number to determine a match of said account number with said authorization number.

83. The method of claim 79 wherein the verification web browser window is launched by a hyperlink provided from said purchase facilitating computer.

84. A method of making purchases over the Internet comprising the steps:
    receiving from a consumer's computer, running a web browser connected to an on-line merchant's website, an ATM card number which will be used to pay a purchase price over the Internet;
    forwarding said ATM card number over the Internet from said on-line merchant's web site to a verification computer;
    receiving an approval or disapproval of the purchase, the approval or disapproval being determined after i) said on-line merchant's web site initiates a verification connection between said consumer computer and said verification computer, said connection including a verification web browser window provided from said on-line merchant's web site to said consumer computer to initiate the verification connection between said consumer computer and said verification computer, said verification connection being independent of, and bypassing, said merchant's web site, ii) said on-line merchant's web site transmits a request for a PIN associated with said ATM card number using said verification web browser window, iii) said verification computer receives over said verification connection a PIN input into said web browser on said consumer's computer, and iv) said verification computer determines whether said ATM card and said PIN are valid, and transmits an approval or disapproval over the Internet to an on-line merchant computer.

85. The method according to claim 84, further comprising the step of:
    initiating a communication connection of said network between the consumer's computer and the verification computer, wherein the initiating is performed by the on-line merchant computer.

86. The method according to claim 84 wherein the authorization number is a user-selected authorization number.

87. The method of claim 84 further comprising synchronizing, at said verification computer, said ATM card number with said PIN to determine a match of said ATM card number with said PIN.

88. The method of claim 84 wherein the verification web browser window is launched by a hyperlink provided from said on-line merchant's web site.

89. A system for making purchases over a computer network using an account number that identifies a consumer's account from which funds will be withdrawn to pay a purchase price and an authorization number associated with said account number which, when used with said account number, enables withdrawal of funds from said account, said system comprising:
    means for receiving by an on-line merchant location said account number over said network from a consumer location;
    means for forwarding said account number over said network from said on-line merchant location to a third party contractor location;
    means for receiving an approval or disapproval of the withdrawal of said funds, the approval or disapproval being determined after i) said on-line merchant location initiates a verification connection between said consumer location and said third party contractor location, said connection including a verification web browser window provided from said on-line merchant location to said consumer location to initiate the verification connection between said consumer location and said third party contractor location, said verification connection being independent of, and bypassing, said on-line merchant location, and ii) said third party contractor location receives said authorization number, bypassing said on-line merchant location, using said verification web browser window over said verification connection from said consumer location, and verifies the validity of said account number and said authorization number; and means for responding to the approval or disapproval by not providing or providing a good or service, respectively, from said on-line merchant location.

90. The system according to claim 89, wherein the authorization number is a user-selected authorization number.

91. The system of claim 89 means for synchronizing, at said third party contractor location, said account number with said authorization number to determine a match of said account number with said authorization.

92. The system of claim 89 wherein the verification web browser window is launched by a hyperlink provided from said on-line merchant location.

* * * * *